US006761105B2

(12) United States Patent
Keaton

(10) Patent No.: US 6,761,105 B2
(45) Date of Patent: Jul. 13, 2004

(54) END WALL ARRANGEMENT FOR FLUID-OPERATED PISTON-TYPE ACTUATOR

(75) Inventor: Rickey L. Keaton, Seneca, SC (US)

(73) Assignee: The Nason Company, Walhalla, SC (US)

( * ) Notice: Subject to any disclaimer, the term of this patent is extended or adjusted under 35 U.S.C. 154(b) by 68 days.

(21) Appl. No.: 10/177,482

(22) Filed: Jun. 21, 2002

(65) Prior Publication Data

US 2003/0000382 A1 Jan. 2, 2003

Related U.S. Application Data

(60) Provisional application No. 60/301,350, filed on Jun. 27, 2001.

(51) Int. Cl.[7] ................................................ F16J 13/10
(52) U.S. Cl. .......................... 92/128; 92/164; 92/169.1
(58) Field of Search ....................... 92/128, 164, 169.1

(56) References Cited

U.S. PATENT DOCUMENTS 2,890,917 A 5/1959 Prince
3,136,230 A 6/1964 Buckley
3,474,710 A 10/1969 Stryker
3,643,551 A * 2/1972 Berg .......................... 92/128
3,986,635 A 10/1976 Niskin
4,167,134 A 9/1979 Yuda .......................... 92/128
4,192,225 A 3/1980 Moyer
4,357,858 A 11/1982 Wedman
4,496,071 A 1/1985 Stewart
4,771,678 A 9/1988 Walker
5,014,871 A 5/1991 Mutter
5,245,911 A 9/1993 Yuda .......................... 92/128
5,335,807 A 8/1994 Gregory
5,357,847 A 10/1994 Stewart
5,400,695 A 3/1995 Walker
5,465,647 A 11/1995 Fish
5,669,284 A 9/1997 Fish
5,720,411 A 2/1998 Darby et al.
5,778,760 A 7/1998 Yuda
6,112,640 A 9/2000 King

* cited by examiner

*Primary Examiner*—F. Daniel Lopez
(74) *Attorney, Agent, or Firm*—Fay, Sharpe, Fagan, Minnich & McKee, LLP

(57) ABSTRACT

A fluid-operated piston-type actuator includes a body having first and second axial ends and an inner surface that defines a bore that opens through at least one of the first and second axial ends to define an open end of the bore. A piston is slidably positioned in the bore. An end wall is positioned in blocking relation with the open end of the bore. The end wall comprises a peripheral surface that defines a first circumferentially extending groove that is axially aligned with a second circumferentially extending groove defined in the inner surface of the body when the end wall is positioned in blocking relation with the open end of the bore. The end wall further comprises an inner face oriented toward the piston and an opposite outer face oriented away from the piston. The first groove is located axially between the inner and outer faces. The outer face covers and blocks access to a majority of the first groove and comprises a first notch defined therein that intersects and provides access to the first groove. A retaining band is located partially in both the first and second grooves. The retaining band is resiliently expanded radially into abutment with an outer wall of the second groove. An end wall and a method of connecting same to a body of a fluid cylinder are also disclosed.

21 Claims, 3 Drawing Sheets

END WALL ARRANGEMENT FOR FLUID-OPERATED PISTON-TYPE ACTUATOR

CROSS-REFERENCE TO RELATED APPLICATION

This application claims priority from and hereby expressly incorporates by reference U.S. provisional application No. 60/301,350 filed Jun. 27, 2001.

BACKGROUND OF THE INVENTION

The present invention relates generally to fluid operated piston type actuators. More particularly, the present invention relates to an improved end wall structure and method of fabricating an improved end wall structure for a fluid-operated piston-type actuator, as well as to a fluid operated piston type actuator including the improved end wall structure.

Fluid-operated piston-type actuators are well-known and in widespread use. Depending upon their particular structure, these actuators incorporate at least one and often two removable end walls for sealing the open end(s) of a bore defined in the actuator body. The end walls sealingly engage the wall of the actuator body defining the bore to prevent fluid from escaping the bore between the end wall and the actuator body. Typically, a piston rod extends through one of the end walls and is slidable relative thereto. Here, again, one or more seals are employed to prevent fluid from escaping the bore between the rod and the end wall.

Conventional end walls and arrangements for operably locating same in a fluid-operated piston-type actuator have been found to be sub-optimal for a variety of reasons. Many end walls are expensive and/or time-consuming to manufacture. Others render the actuator more difficult and expensive to assemble. Still others do not present a smooth, uninterrupted surface that can be tapped or otherwise used to anchor related components. Also, end walls that include large open cavities in their outer faces are undesirable in many application owing to the fact that dirt and other debris can collect in these cavities and the retaining band is exposed.

SUMMARY OF THE INVENTION

In accordance with a first aspect of the present development, a fluid-operated piston-type actuator comprises a body having first and second axial ends and an inner surface that defines a bore that opens through at least one of said first and second axial ends to define an open end of the bore. A piston is slidably positioned in the bore. An end wall is positioned in blocking relation with the open end of the bore. The end wall comprises a peripheral surface that defines a first circumferentially extending groove that is axially aligned with a second circumferentially extending groove defined in the inner surface of the body when the end wall is positioned in blocking relation with the open end of the bore. The end wall further comprises an inner face oriented toward the piston and an opposite outer face oriented away from the piston. The first groove is located axially between the inner and outer faces. The outer face covers and blocks access to a majority of the first groove and comprises a first notch defined therein that intersects and provides access to the first groove. A retaining band is located partially in both the first and second grooves. The retaining band is resiliently expanded radially into abutment with an outermost wall of the second groove.

In accordance with another aspect of the present development, a method of connecting an end wall to a body of a fluid cylinder comprises placing an end wall inside an open mouth of a bore defined in a body of a fluid cylinder and adjusting an axial position of the end wall in the bore so that a first groove that is defined in a peripheral surface of the end wall is aligned with a second groove that is defined in the body. A first end of a retaining band is fed in a first direction into the first groove through a notch defined in an outer face of said end wall. The end wall is rotated in a second direction that is generally opposite the first direction so that the retaining band is received in the first and second grooves.

In accordance with another aspect of the present development, an end wall for a fluid cylinder comprises a peripheral cylindrical surface that defines a first circumferentially extending groove adapted to be aligned with a second circumferentially extending groove defined in an inner surface of an associated body when the end wall is positioned in blocking relation with an open end of the bore. The end wall further comprises an inner face and an outer face oriented away from the inner face. The first groove is located axially between the inner and outer faces and the outer face covers and blocking access to a majority of the first groove. A first notch is defined in the outer face and intersects and provides access to said first groove.

One advantage of the present invention resides in the provision of a novel and unobvious end wall for a fluid-operated piston-type actuator, a fluid-operated piston-type actuator including same, and a method of assembling a fluid-operated piston-type actuator.

Another advantage of the present invention is found in the provision of a novel and unobvious method for manufacturing an end wall for a fluid-operated piston-type actuator, and an end wall made according to the method.

Still another advantage of the present invention resides in the provision of an end wall for a fluid-operated piston-type actuator wherein an outer face of the end wall is primarily smooth and uninterrupted, e.g., planar.

A further advantage of the present invention is that it provides a cost-effective method for fabricating an end wall for a fluid operated piston type actuator.

A yet further advantage of the present invention resides in the provision of a fluid-operated piston-type actuator having an end wall secured to a body thereof by a metal band, wherein a majority of the band, when operably positioned, is inaccessibly located behind an outer face of the end wall.

Still other benefits and advantages of the present invention will become apparent to those of ordinary skill in the art to which the invention pertains upon reading this specification.

BRIEF DESCRIPTION OF THE DRAWINGS

The invention comprises a variety of components and arrangements of components, and a variety of steps and arrangements of steps, preferred embodiments of which are illustrated in the accompanying drawings that form part hereof wherein.

DETAILED DESCRIPTION OF THE PREFERRED EMBODIMENTS

Figure 1:
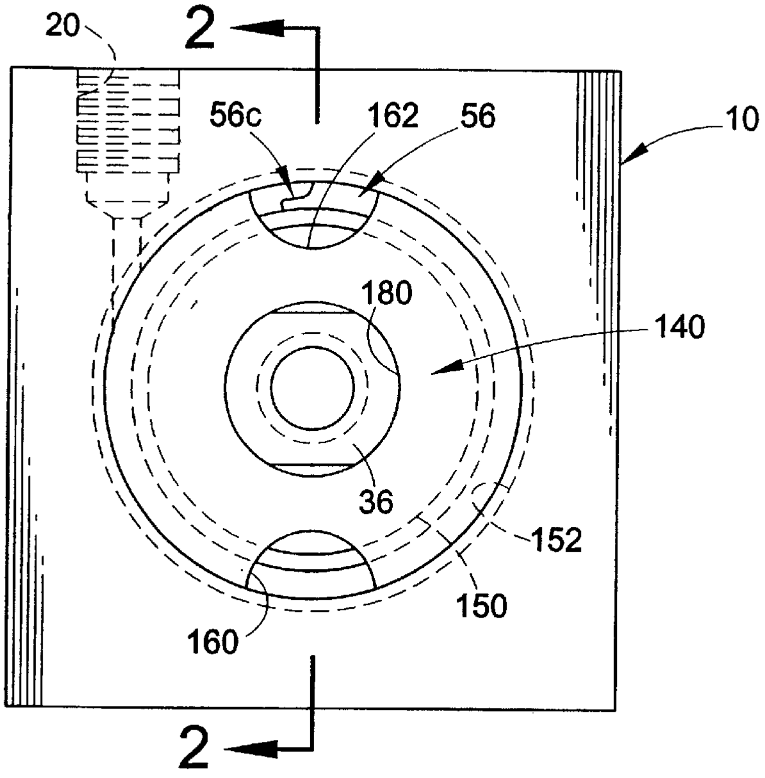
FIG. 1 is a top plan view of a fluid-operated piston-type actuator constructed in accordance with the present invention and including an end wall formed in accordance with the present invention.
Figure 2:
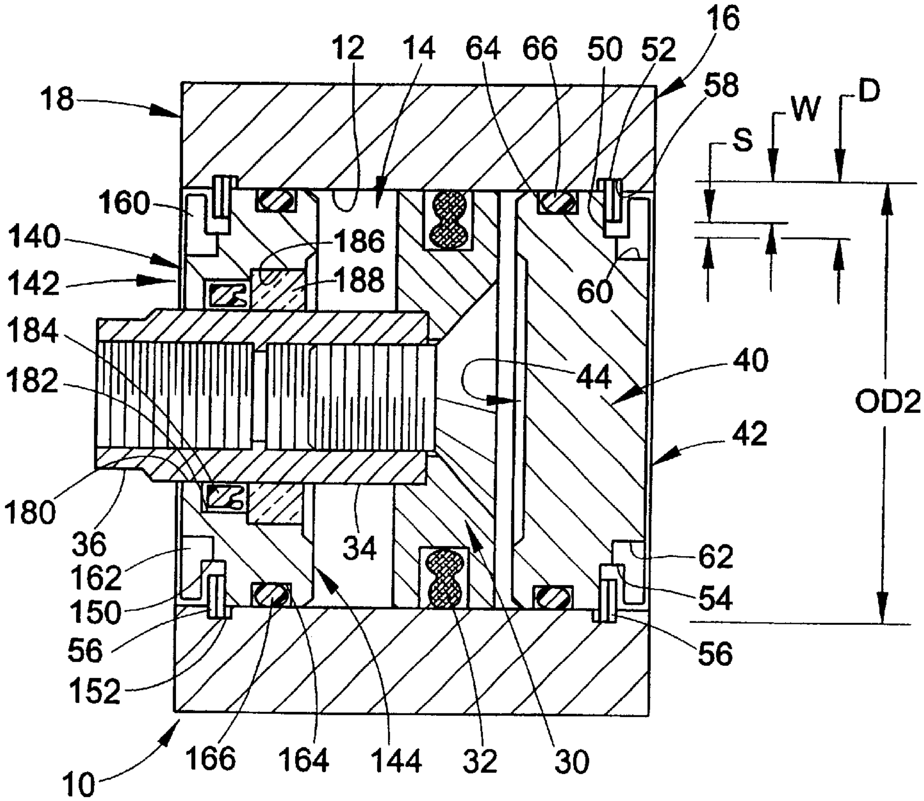
FIG. 2 is a sectional view taken along line 2—2 of FIG. 1.

Referring now to the drawings, FIGS. 1 and 2 illustrate a fluid-operated piston-type actuator constructed in accordance with the present invention. The actuator comprises a body 10 having an inner surface 12 that defines a cylindrical bore 14. In the illustrated embodiment, the bore 14 is a through-bore that extends between and through opposite first and second axial ends 16, 18 of the body 10. In an alternative embodiment, the bore 14 is a blind bore open at only one of the ends 16, 18. One or more ports 20 are defined in the body and provide fluid communication with the bore 14.

A piston 30 is closely received in the bore 14 and is adapted for reciprocal axial sliding movement between the first and second ends 16, 18 of the body 10. Movement and positioning of the piston 30 is controlled by fluid pressure on its opposite faces as varied by fluid introduced into or exhausted from the bore 14 through the one or more ports 20. As is generally well-known, the piston 30 is sealingly engaged to the inner surface 12 by one or more seals 32 that prevent or at least substantially inhibit fluid flow between the piston 30 and the inner surface 12 while still allowing for axial sliding movement of the piston as described. A rod 34 is connected to the piston 30 and projects outwardly therefrom. The rod 34 includes an outermost end 36 adapted to be connected to an associated member to be moved in response to axial movement of the piston/rod assembly 30/34.

The bore 14 at the first end 16 of the body 10 is closed by a first end wall 40 formed in accordance with the present invention. The first end wall 40, also illustrated separately in FIGS. 6 and 7, defines an outer face 42, an inner face 44 and a peripheral surface 46. The outer and inner faces 42, 44 preferably comprise planar surfaces while the peripheral surface 46 preferably comprises a cylindrical surface. The first end wall 40 is dimensioned and conformed for close, sliding receipt in the first end 16 of the bore 14. The peripheral surface 46 of the end wall 40 defines a first circumferential groove 50 that, when the end wall 40 is operably positioned in the end 16 of the bore 14 as shown in FIG. 2, is adapted to align axially with a circumferential groove 52 defined in the inner surface 12 defining the bore 14.

The grooves 50,52 together are adapted for receipt of a retaining band 56 (see also FIG. 4) that is preferably manufactured from a one-piece polymeric or metallic band member preformed into a circular or helical shape. An innermost wall 54 defines the groove 50 to have a first depth, while an outermost wall 58 defines the groove 52 to have a second depth.

Figure 4:
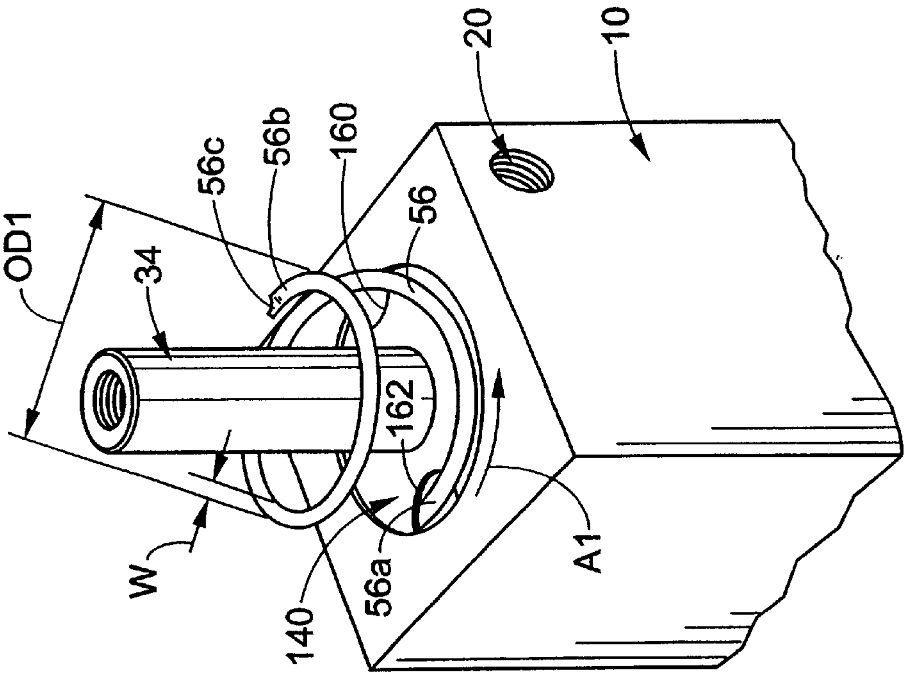
FIG. 4 is similar to FIG. 3 but shows the preformed retaining band only partially inserted into or removed from its operative position.

The band 56, as shown in an partially installed and relaxed condition in FIG. 4, is resilient and defines a maximum width W that is smaller than the combined depth D (FIG. 2) of the grooves 50,52. Furthermore, the band 56 defines a relaxed maximum outer diameter OD1 that is greater than a diameter OD2 (FIG. 2) of the circumferential groove 52. Thus, when the band 56 is operatively installed as shown in FIG. 2, it is radially compressed by the outermost wall 58 of the groove 52 so that its maximum outer diameter OD1 is reduced and made equal to the diameter OD2.

Consequently, when installed in its operative position, the band 56 is in resilient compressed abutment with the outermost wall 58 of the groove 52 and a circumferentially extending gap S is defined between the band 56 and the innermost wall 54 of the first groove 50. When the band 56 is operatively installed as shown in FIG. 2, it is partially located in each of the grooves 50,52, and axial movement of the end wall 40 in the bore 14 is prevented by the presence of the band 56. The space S facilitates installation of the band 56 by providing a temporary space into which the band can move temporarily during its installation. The presence of the space S allows for the first groove 50 to be substantially enclosed behind the outer face 42 of the end wall 40 without excessive binding of the band 56 in the first groove 50 during installation of the band 56. A result of this arrangement is that the band 56 is not seated against the innermost surface 54 of the first groove 50 when operatively installed as is readily apparent from the drawings.

In one preferred embodiment, the band 56 is metallic and has a width W of 0.131 inches and the grooves 50,52 have a combined depth of 0.210 inches so that the space S is 0.079 inches. It is most preferred that the space S be at least 0.05 inches. Also, it is most preferred that the groove 50, taken alone, also define a minimum depth of that is at least approximately 0.010 inches greater than the width W of the band 56 to allow sufficient clearance for the band during installation. Of course, these dimensions can vary without departing from the overall scope and intent of the present invention. Also, each groove 50,52 has a axial length sufficient to accommodate the band 56 when the band is operatively installed and compressed a maximum amount axially as shown in FIG. 2. Generally, when the band 56 is operatively installed, it describes at least a full circle, i.e., 360° and can describe a helix having multiple turns, e.g., a helix that passes through 1080°. In any case, when axially compressed as shown in FIG. 2, the band 56 defines an axial length equal to the stacked height of its turns, and the grooves 50,52 are dimensioned to have a slightly greater axial length to accommodate the band.

The end wall 40 defines at least one and preferably two peripheral notches 60,62 that preferably open in both the outer face 42 and the peripheral surface 46. The notches 60,62 are preferably located at diametrically opposed locations on the periphery of the end wall 40 and each intersects and communicates with the first groove 50. Therefore, those of ordinary skill in the art will recognize that, when the end wall 40 is operably located in the first end 16 of the bore 14, the notches 60,62 provide a location for feeding the retaining band 56 into (and for withdrawing the retaining band from) the aligned grooves 50,52. The notches 60, 62 are also conformed and located to receive two projections of an associated tool (not shown) that is used to rotate the end wall 40 as needed during band installation as described below. A seal retaining peripheral groove 64 is also defined in the peripheral surface 46 of the end wall 40. The groove 64 is adapted for operative receipt of an O-ring or other seal 66 that sealingly engages the surface 46 of the end wall 40 to the inner surface 12 of the housing 10 to prevent fluid passage between the end wall 40 and the inner surface 12.

Figure 6:
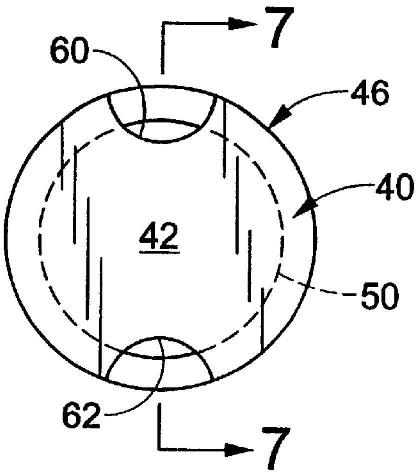
FIG. 6 is a top plan view of an end wall formed in accordance with one embodiment of the present invention; and, FIG. 7 is a sectional view taken along line 7—7 of FIG. 6.
Figure 7:
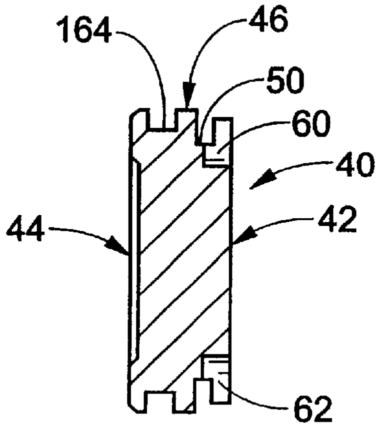

With reference now particularly to FIGS. 5A–7, a preferred method for manufacturing the end wall 40 is illustrated. An axial length of raw bar stock 70 is provided with or machined to have a circular cross-section. As shown in FIG. 5B, the stock 70 has a first planar face 72, and second planar face 74 and a cylindrical peripheral face 76. The surface 76 of the stock 70 is machined using conventional machinery to define the peripheral surface 46 of the end wall 40 including the first peripheral groove 50 and the seal-retaining groove 64 as shown in FIGS. 6 and 7. Also, if desired or necessary, the face 72 of the stock is machined to define the outer face 42 of the end wall 40. The peripheral notches 60,62 are machined into the face 42 and peripheral surface 46 as described above. Furthermore, if necessary or desired, the face 74 of the stock 70 is machined to define the inner face 44 of the end wall 40. Those or ordinary skill in the art will recognize that the machining involved is minimal as compared to conventional end wall structures.

Referring again to FIGS. 1 and 2, an end wall 140 is operably secured in the second end 18 of the bore 14. Except and shown and described herein, the end wall 140 is identical to the end wall 40. Thus, like features of the end wall 140 relative to the end wall 40 are identified using reference numbers that are one-hundred (100) greater than those used to identify features of the end wall 40, and further repetition of these like features is not necessary or provided. New features are identified with new reference numerals and are described below.

The inner surface 12 that defines the bore 14 in the actuator body 10 defines a circumferential groove 152 that is identical to the groove 52 defined by the inner surface 12 at the first end 16 of the bore 14. When the end wall 140 is operably located in the second end 18 of the bore 14, the grooves 150, 152 are axially aligned with each other so that the retaining band 56 can be used to axially fix the end wall 140 in the bore 14 as described above in relation to the end wall 40.

Unlike the end wall 40, the end wall 140 defines a central opening 180 in which the piston rod 34 is slidably positioned. Thus, the piston rod 34 projects through the opening 180 in the end wall 140 and is axially movable relative to the end wall 140 in response to axial movement of the piston 30. The opening 180 is defined to include a first stepped area 182 that receives an annular seal 184. The seal prevents or at least inhibits fluid flow between the rod 34 and the end wall 140. The opening 180 is also defined with a region 186 adapted to receive an annular bushing and/or seal 188.

Figure 3:
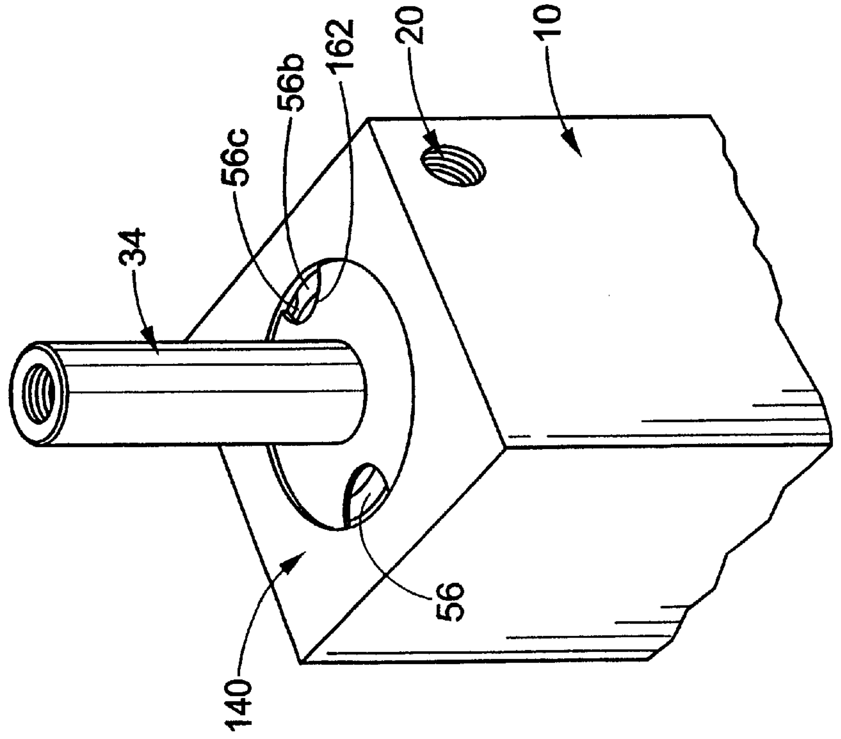
FIG. 3 is a partial perspective view of the fluid-operated piston-type actuator of FIG. 1, with the preformed retaining band being operably positioned.
Figure 5A:
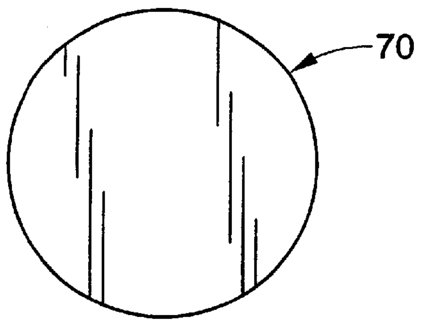
FIG. 5A is a top plan view of raw bar stock from which an end wall in accordance with the present invention is fabricated according to a novel and unobvious method.
Figure 5B:
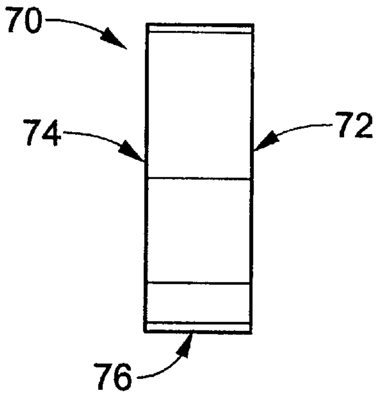
FIG. 5B is a side elevational view of the raw bar stock shown in FIG. 5A.

With reference now to FIGS. 3 and 4, installation of the end wall 140 into the second end 18 of the bore 14 is explained. The procedure in identical for operative installation of the end wall 40 into the first end 16 of the bore 14.

As shown in FIG. 4, a first end **56*a* of the retaining band 56 is inserted into the aligned grooves 150, 152 through one of the notches 160, 162. The band 56 is preferably fed into the grooves as far as possible, typically until the first end 56*a* travels circumferentially through the grooves for approximately 360°. After that, assuming the entire band 56 has not been inserted to the grooves 150, 152 (i.e., assuming that the band 56 describes more than a simple circle), the end wall 140 is rotated in a direction Al opposite the direction in which the band 56 has been fed into the grooves 150, 152. Continued rotation of the end wall 140 in the direction A1 results in the entire band 56 being fed into the grooves 150, 152. Preferably, rotation of the end wall 140 is stopped when a second end 56*b* of the band 56 is located in one of the notches 160, 162 as shown in FIG. 3. Most preferably, the second end 56*b* of the band 56 defines an upturned tail 56*c* that is inclined at an angle of, e.g., 30°, and that can be pulled using pliers or the like to facilitate removal of the band 56 according to a procedure that is a reverse of the foregoing installation procedure. During installation of the band 56, the upturned tail 56*c* that is located in one of the notches 160, 162 is manually flattened and moved radially outwardly so that it is held substantially flat in the groove 52 as shown in FIG. 1. When the band 56 is to be removed, the portion of the tail 56*c* that is visible in the notch 160, 162 is pulled radially inwardly (using e.g., a screwdriver or other blade) so that the tail is pulled from the groove 52 and resiliently springs and returns to its upturned state where it is easily accessible to pliers or a like tool. Because the notches 160, 162 are relatively small compared to the entire area of the outer surface 142, the upturned tail 56*c* is important in that it allows for use of pliers or a like tool for grasping and puling the band 56 in the confined space of the notches 160, 162 during removal of the band. Furthermore, as noted, the tail 56*c* is selectively movable into the groove 52 to flatten the tail selectively after installation of the band 56** to minimize tampering, damage and the like.

As shown in FIG. 3, a main advantage of the present invention is that, when the band 56 is fully installed, the band is visible and exposed only at the notches 160, 162 (notches 60,62 of the end wall 40). A great majority of the band 56 is protected and inaccessible. It is preferred that at least 75% of the first groove 50, 150 be covered and rendered inaccessible behind the outer face 42, 142, respectively. As such, a corresponding percentage of the band 56 is protected and unexposed when operatively installed. Stated another way, it is most preferred that the notches 60,62, taken together, expose no more than 25% of the circumference of a band 56 held in the groove 50. Similarly, it is preferred that the notches 160, 162, taken together, expose no more than 25% of the circumference of a band 56 installed in the groove 150. This limited size of the notches 160, 162 limits the space for accumulation of debris. In spite of the fact that the grooves 50,52 of the end wall 40 and the grooves 150, 152 of the end wall 140 are primarily enclosed behind the respective faces 42, 142, installation of the band 56 in these grooves is not difficult owing to the presence of the space S described above. As noted, the space S temporarily accommodates the band 56 as required during its installation.

In an alternative embodiment, when the retaining band 56 is operatively installed, a tail portion **56*c* of the retaining band can remain outside of the grooves 50,52 and/or 150, 152 and extend from the notches 60, 62 and/or 160, 162. In this case, at a minimum, the portion of the retaining band 56 actually located in the grooves 50,52 and/or 150, 152 is formed in accordance with the present invention. Thus, the appended claims are intended to encompass this alternative arrangement insofar and the claim limitations are satisfied by the portion of the band 56 actually located in the grooves 50,52 and/or 150, 152**.

The invention has been described with reference to preferred embodiments. Modifications may occur to those of ordinary skill in the art, and it is intended that the invention be construed as including all such modifications and alterations.

Having thus described the preferred embodiments, what is claimed is:

1. A fluid-operated piston-type actuator comprising:

a body having first and second axial ends and an inner surface that defines a bore that opens through at least one of said first and second axial ends to define an open end of said bore;

a piston slidably positioned in said bore;

an end wall positioned in blocking relation with said open end of said bore, said end wall comprising: (i) a peripheral surface that defines a first circumferentially extending groove that is axially aligned with a second circumferentially extending groove defined in said inner surface of said body; and, (ii) an inner face oriented toward said piston and an opposite outer face oriented away from said piston, said first groove located axially between said inner and outer faces, said outer face covering and blocking access to a majority of said first groove and comprising at least one notch defined therein that intersects said first groove, wherein said at least one notch is the only access opening to said first and second grooves;

a retaining band located partially in both said first and second grooves, said retaining band resiliently expanded radially into abutment with an outer wall of said second groove and extending for at least 360° within said first and second grooves, wherein said band is selectively removable from said first and second grooves only via said at least one notch.

2. The actuator as set forth in claim 1, wherein said at least one notch comprises first and second notches defined in said outer face of said end wall.

3. The actuator as set forth in claim 2, wherein said first and second notches are located opposite each other on a periphery of said outer face.

4. The actuator as set forth in claim 1, wherein said outer surface blocks access to at least about 75% of said first groove.

5. The actuator as set forth in claim 2, wherein said outer surface blocks access to at least about 75% of said first groove.

6. A fluid-operated piston-type actuator comprising:

a body having first and second axial ends and an inner surface that defines a bore that opens through at least one of said first and second axial ends to define an open end of said bore;

a piston slidably positioned in said bore;

an end wall positioned in blocking relation with said open end of said bore, said end wall comprising: (i) a peripheral surface that defines a first circumferentially extending groove that is axially aligned with a second circumferentially extending groove defined in said inner surface of said body when said end wall is positioned in blocking relation with said open end of said bore; and, (ii) an inner face oriented toward said piston and an opposite outer face oriented away from said piston, said first groove located axially between said inner and outer faces, said outer face covering and blocking access to a majority of said first groove and comprising a first notch defined therein that intersects and provides access to said first groove;

a retaining band located partially in both said first and second grooves, said retaining band resiliently expanded radially into abutment with an outer wall of said second groove, wherein said retaining band defines a maximum width and wherein said first circumferentially extending groove defines a minimum depth that is at least approximately 0.010 inches greater than said maximum width of said retaining band.

7. The actuator as set forth in claim 6, wherein said retaining band describes at least 360° in said first and second circumferentially extending grooves.

8. The actuator as set forth in claim 1, wherein said first groove has a radially inner wall and wherein a space is defined between said retaining band and said radially inner wall of said first groove.

9. The actuator as set forth in claim 1, wherein said first groove defines a depth that is greater than a maximum width of said retaining band.

10. The actuator as set forth in claim 1, wherein a rod is secured to said piston to move therewith and wherein said end wall defines an opening through which said rod extends.

11. A fluid-operated piston-type actuator comprising:

a body having first and second axial ends and an inner surface that defines a bore that opens through at least one of said first and second axial ends to define an open end of said bore;

a piston slidably positioned in said bore;

an end wall positioned in blocking relation with said open end of said bore, said end wall comprising; (i) a peripheral surface that defines a first circumferentially extending groove that is axially aligned with a second circumferentially extending groove defined in said inner surface of said body when said end wall is positioned in blocking relation with said open end of said bore; and, (ii) an inner face oriented toward said piston and an opposite outer face oriented away from said piston, said first groove located axially between said inner and outer faces, said outer face covering and blocking access to a majority of said first groove and comprising a first notch defined therein that intersects and provides access to said first groove;

a retaining band located partially in both said first and second grooves, said retaining band resiliently expanded radially into abutment with an outer wall of said second groove, wherein said retaining band is preformed into a helical configuration.

12. The actuator as set forth in claim 2, wherein said retaining band comprises a tail located in one of said first and second notches.

13. The actuator as set forth in claim 1, wherein said retaining band comprises a tail portion that is upturned relative to a remaining portion of said retaining band.

14. The actuator as set forth in claim 11, wherein said retaining band comprises a tail that is preformed to be upturned relative to a remaining portion of said retaining band and wherein said tail is partially inserted into said second groove to hold said tail flat against said remaining portion of said retaining band.

15. A method of connecting an end wall to a body of a fluid cylinder, said method comprising:

placing an end wall inside an open mouth of a bore defined in a body of a fluid cylinder;

adjusting an axial position of said end wall in said bore so that a first groove defined in a peripheral surface of said end wall is aligned with a second groove defined in said body;

feeding a first end of a retaining band in a first direction into said first groove through a notch defined in an outer face of said end wall;

rotating said end wall in a second direction that is generally opposite said first direction so that said retaining band is received in said first and second grooves.

16. The method as set forth in claim 15, wherein said step of rotating said end wall comprises rotating said end wall until said retaining band located in said first and second grooves defines an arc of at least 360°.

17. The method as set forth in claim 15, further comprising concealing at least 75% of said retaining band behind said outer face of said end wall when said retaining band is fed into said notch.

18. The method as set forth in claim 15, further comprising:

positioning an upturned tail portion of said retaining band in said notch;

flattening said upturned tail portion; and, moving said flattened tail portion radially outwardly into said second groove.

19. A method of connecting an end wall to a body of a fluid actuator, said method comprising:

placing an end wall inside an open mouth of a bore defined in a body of a fluid actuator;

adjusting an axial position of said end wall in said bore so that a first groove defined in a peripheral surface of said end wall is aligned with a second groove defined in said body;

feeding a first end of a retaining band into said first and second grooves through a notch defined in an outer face of said end wall;

rotating said end wall so that said retaining band moves into said first and second grooves through said notch.

20. The method as set forth in claim 19, wherein said step of rotating said end wall comprises rotating said end wall until said retaining band located in said first and second grooves defines an arc of at least 360°.

21. The method as set forth in claim 19, further comprising positioning an upturned tail portion of said retaining band in said notch.

* * * * *